Patented Aug. 6, 1946

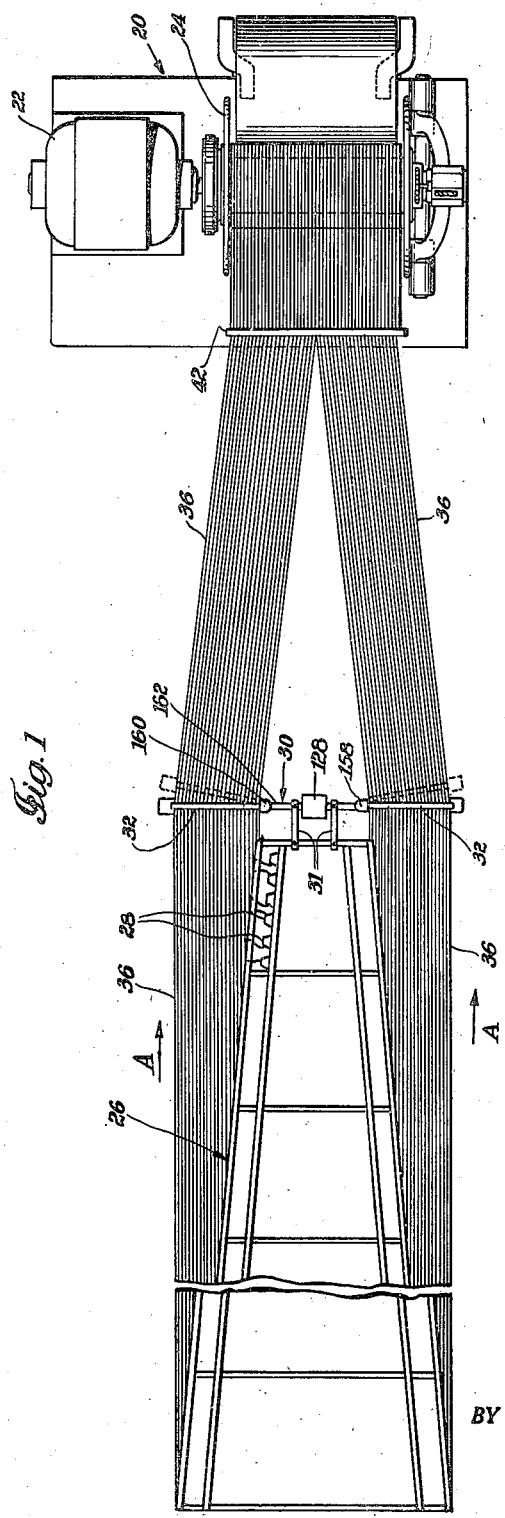
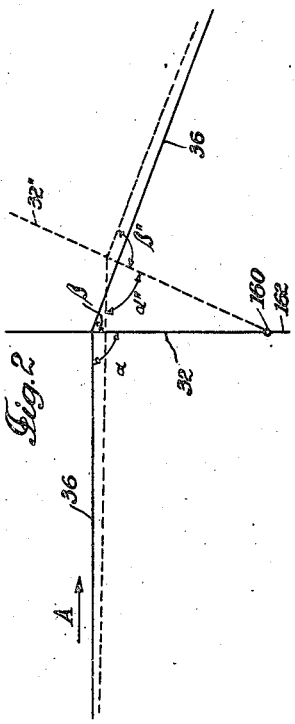

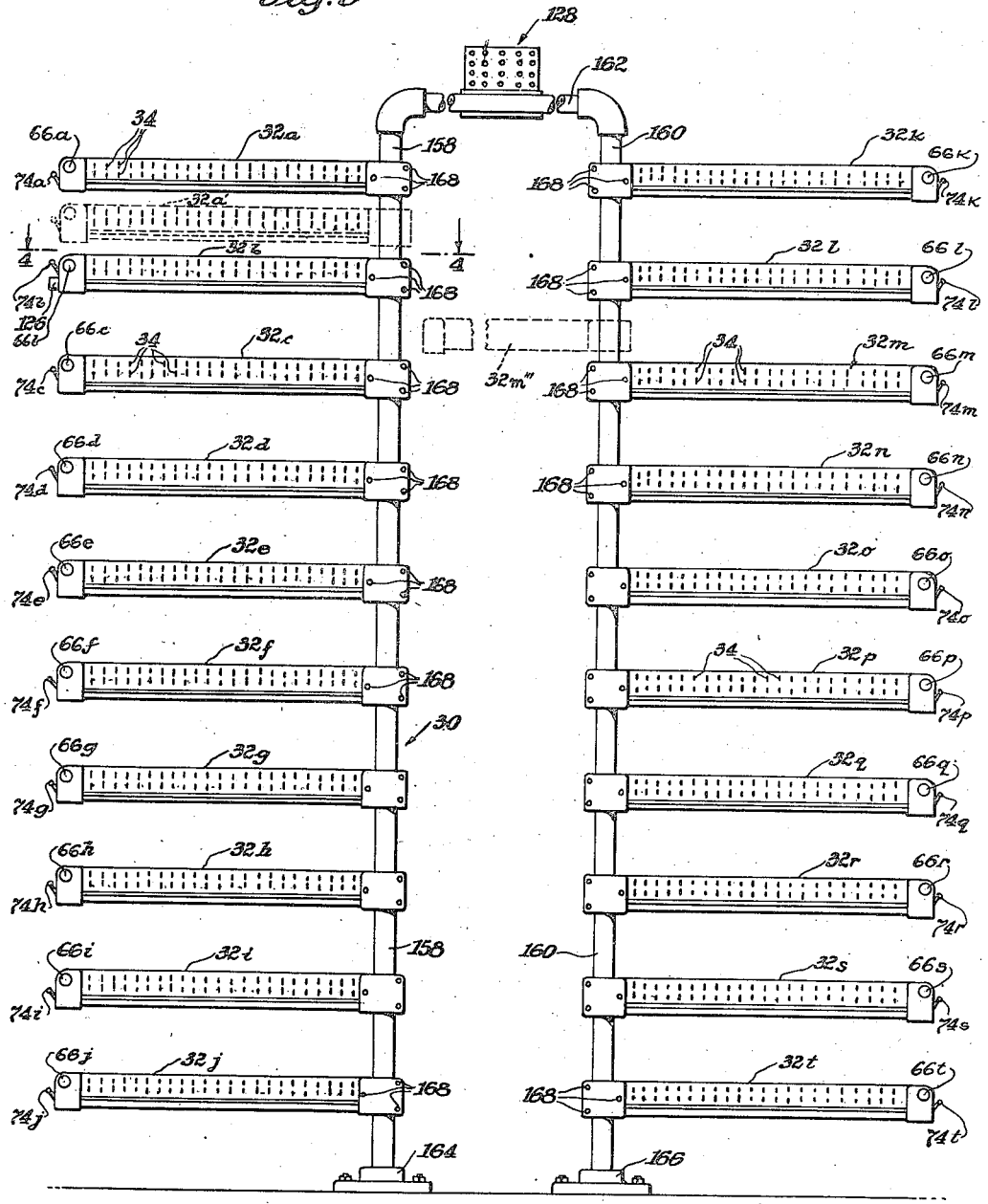

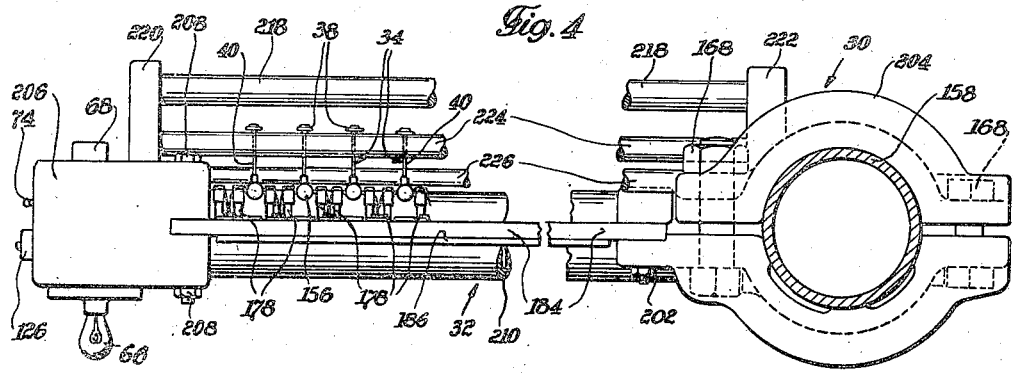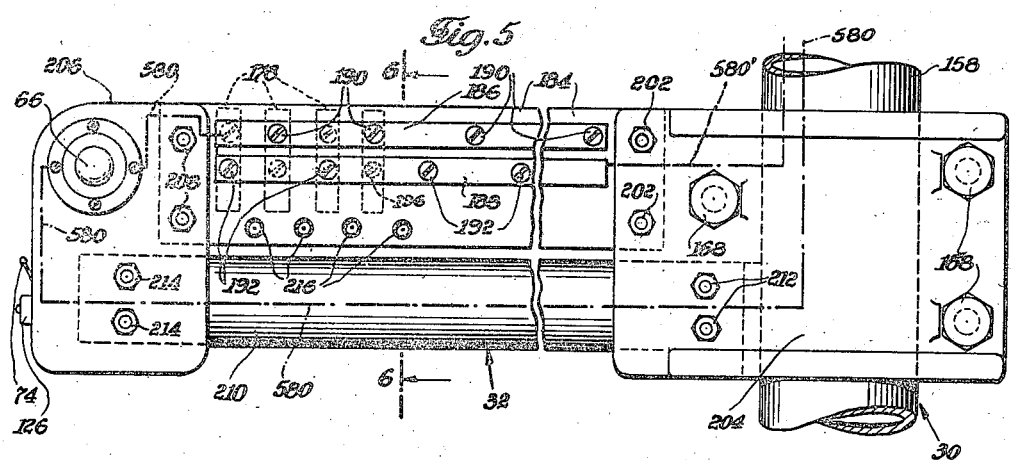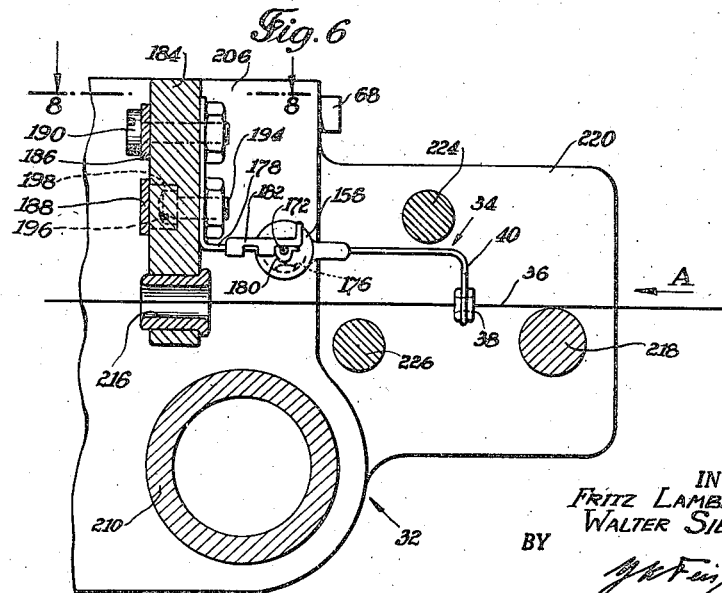

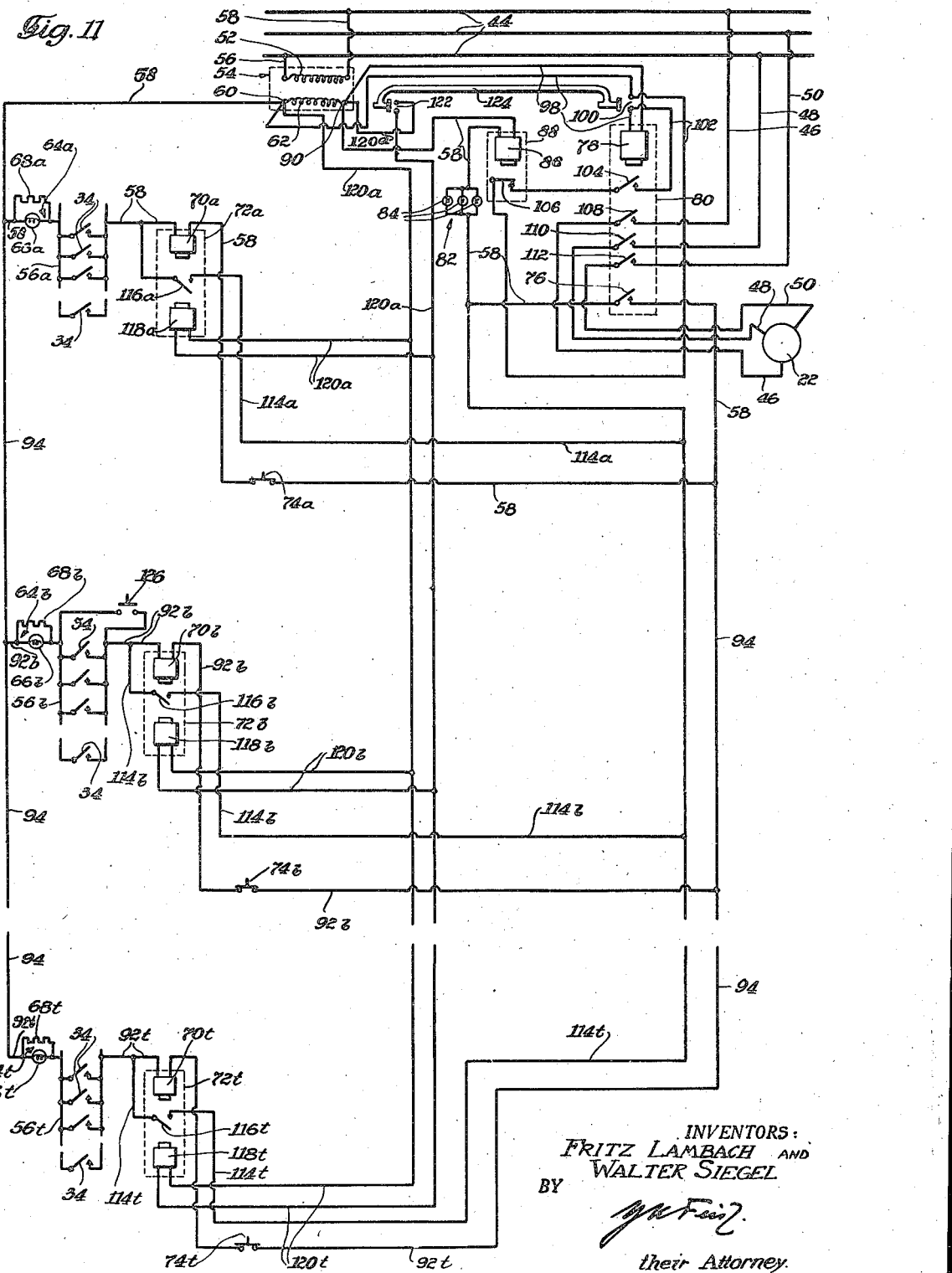

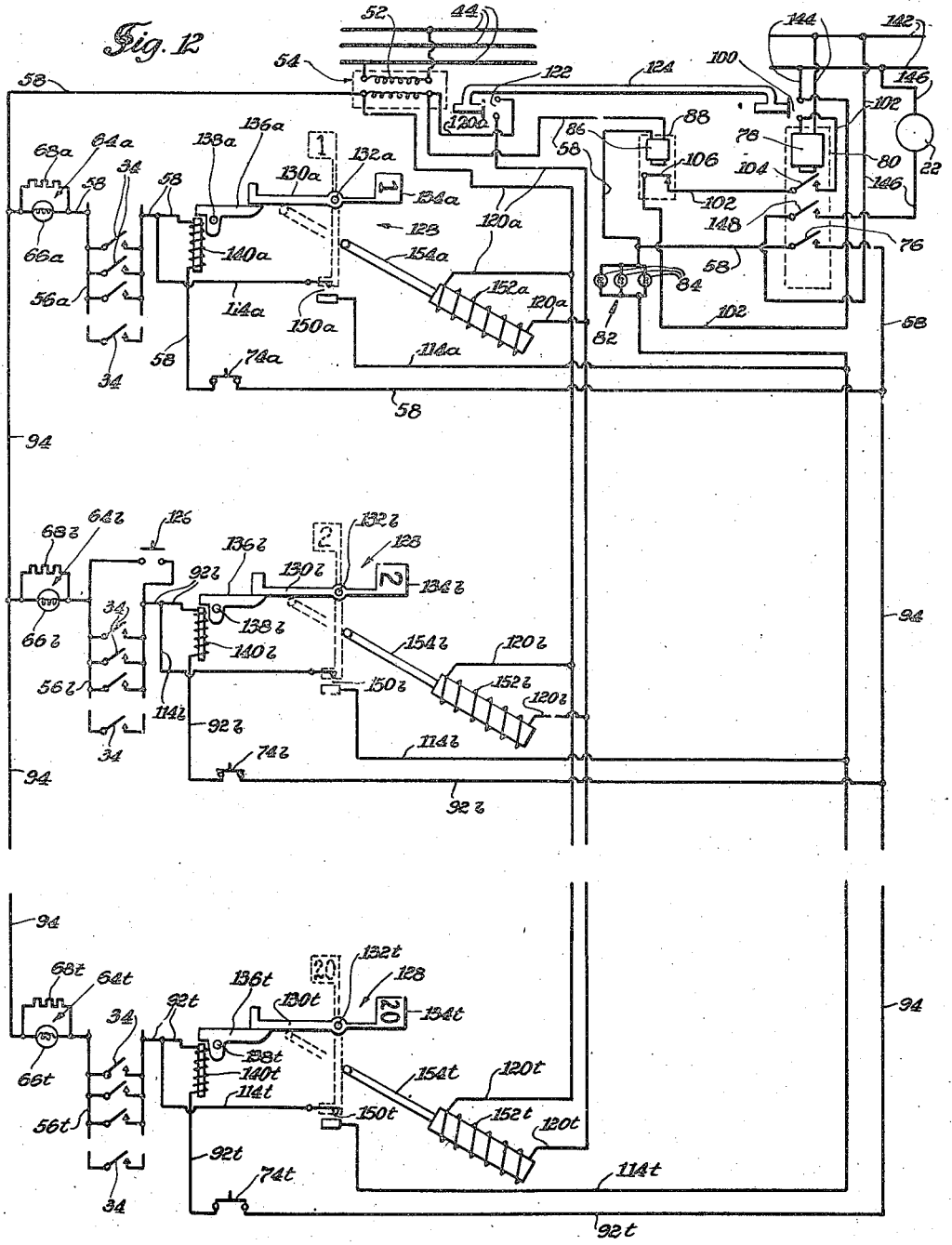

2,405,218

UNITED STATES PATENT OFFICE 2,405,218

ELECTRICALLY OPERATED STOP MOTION FOR WARPING OR BEAMING PLANTS

Fritz Lambach, Tenafly, and Walter Siegel, Union City, N. J., assignors to Robert Reiner, Inc., Weehawken, N. J.

Application May 11, 1943, Serial No. 486,524

22 Claims. (Cl. 28—51)

Our invention relates to textile machines, and more particularly to an electrically operated stop motion for a warping or beaming plant.

One object of our invention is to improve upon the electrically operated stop motion for warping or beaming plants as now ordinarily made.

Our invention consists in certain novel features of an electrically operated stop motion as will be fully described hereinafter.

Further objects and advantages of the invention will be apparent from the following disclosure of several embodiments thereof.

Figure 7:
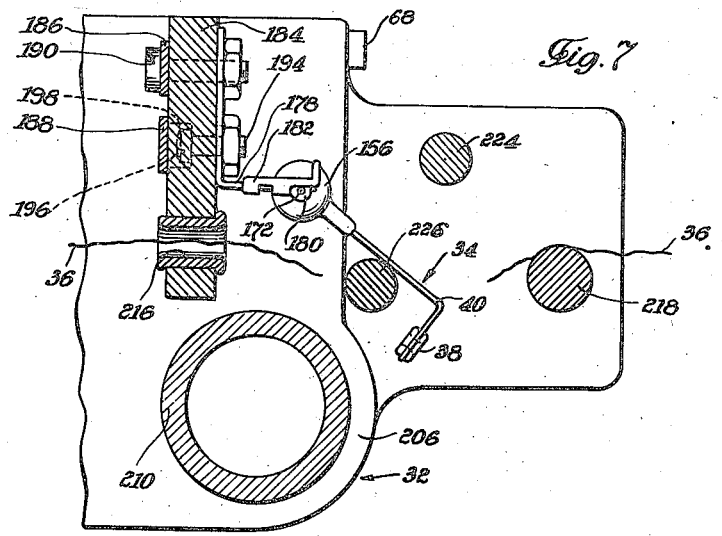
Figure 8:
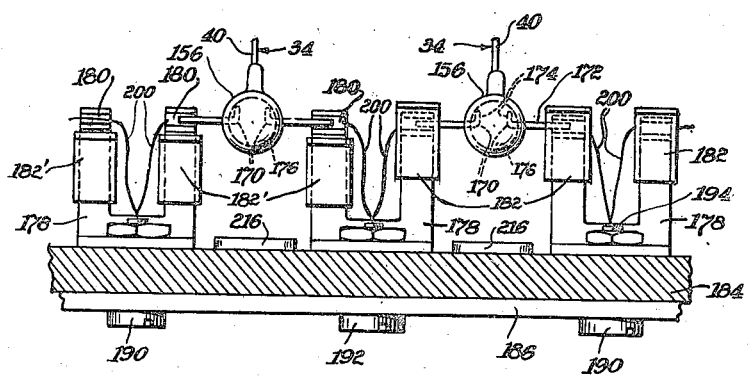
Figure 9:
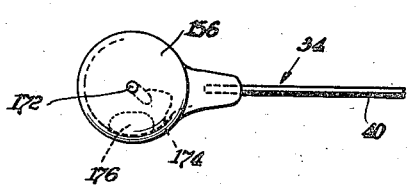
Figure 10:
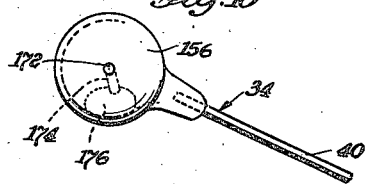

In the accompanying drawings:

Fig. 1 a more or less diagrammatical top plan view of a warping plant comprising a creel, a frame for the support of the control needles of an electrically operated stop motion, and a warper, Fig. 2 a diagrammatical illustration of the change in the angles between the oncoming end and leaving end of a warp yarn and an adjustable arm of the frame carrying the control needles by a change in the position of the arm, Fig. 3 an elevational view of the frame for the support of the control needles, in a somewhat diagrammatical manner, Fig. 4, in an enlarged scale, a sectional view of the frame taken on line 4—4 of Fig. 3, illustrating some details of an arm of the frame, Fig. 5 an elevational view of the arm of the frame shown in Fig. 4, Fig. 6, in an enlarged scale, a fragmentary sectional view of an arm of the frame taken on line 6—6 of Fig. 5, Fig. 7 a fragmentary sectional view of an arm similar to that shown in Fig. 6, wherein, however, the control needle is in the circuit closing position upon breakage of a warp yarn, Fig. 8 a fragmentary sectional view of an arm with the supporting members carrying the mercury switches of the control needle, taken on line 8—8 of Fig. 6, Fig. 9 an elevational view of a mercury switch in its off-position, Fig. 10 an elevational view of a mercury switch in its on-position upon breakage of a warp yarn, Fig. 11 a circuit diagram of an electrically operated stop motion for a warping or beaming plant, wherein the switches are shown in their normal positions when the relays are deenergized, and Fig. 12 another embodiment of a circuit diagram of an electrical stop motion equipped with an annunciator; again the switches being shown in their normal positions when the relays are deenergized.

Referring now to Fig. 1, 20 generally indicates a warper having a motor 22 for driving a beam 24. 26 generally indicates a stationary creel carrying a plurality of bobbins 28, only a portion of said bobbins being shown in the drawings. 30 generally indicates a frame connected to the creel by two connecting bars 31 and equipped with a plurality of arms 32 carrying rows of control needles or drop needles not shown in Fig. 1. The control needles or drop needles are diagrammatically indicated by 34 in Fig. 3, according to which one row of such needles is arranged on each of the twenty arms 32a, 32b, 32c, . . . 32t of the frame 30. The construction and arrangement of the control needles will be described hereinafter in detail in connection with Figs. 4–10.

During the normal operation of the warping or beaming plant, the warp yarns 36 travel from the bobbins 28 in the direction of the arrow A through eyelets 38 of control fingers 40 of the control needles 34 and through a reed 42 of the warper 20 to the beam 24 upon which they are being wound.

In case of a warp yarn breakage, however, the control needle or control needles 34 cooperating with such broken warp yarn or warp yarns drop into the "on-position" shown in Fig. 7. This "on-position" of a control needle 34 serves to close a needle control circuit of the electrically operated stop motion for causing a stoppage of the motor 22 of the warper 20 as will be described hereinafter.

Referring now to Fig. 11, we describe the various circuits of the electrically operated stop motion for an understanding of the operation thereof. 44 indicates an alternating current supply line connected with a source of current (not shown). The motor 22 of the warper 20 is connected with said supply line 44 by lines 46, 48 and 50. Furthermore, the primary winding 52 of a low voltage transformer 54 is connected with said supply line 44 by lines 56 and 57.

As pointed out above, in the embodiment shown in the drawings, the stop motion is provided with twenty rows 56a, 56b, 56c, . . . 56t of control needles 34. As best shown in Fig. 11, the control needles 34 of each row are connected with each other in parallel.

The first row 56a of control needles 34 is arranged in the main needle control circuit 58 which may be traced as follows: Starting from the terminal 60 of the secondary winding 62 of the transformer 54, the main needle control circuit 58 includes a set 64a consisting of a control lamp 66a and a resistor 68a connected with each other in parallel, the electromagnet 70a of a mechanical latch-in electric reset relay 72a, a manual circuit closing switch 74a, a circuit breaking switch 76 controlled by the electromagnet 78 of the main motor control relay 80, a safety lamp bank 82 consisting of three lamps 84 connected with each other in parallel, the electromagnet 86 of a stop control relay 88, and ends at the terminal 90 of the secondary winding 62 of the transformer 54.

The second row 56b of control needles 34 is arranged in an additional needle control circuit 92b including a set 64b of a control lamp 66b and resistor 68b, an electromagnet 70b of a mechanical latch-in electric reset relay 72b and a manual circuit closing switch 74b.

The remaining rows of control needles 34 are arranged in similar additional needle control circuits. For example, the last row 56t of control needles 34 is arranged in an additional needle control circuit 92t including a set 64t of a control lamp 66t and resistor 68t, an electromagnet 70t of a mechanical latch-in electric reset relay 72t and a manual circuit closing switch 74b.

The additional needle control circuits 92b, 92c, 92d . . . 92t are connected in parallel with each other and with the main needle control circuit 58 by lines 94. The electromagnet 78 of the main motor control relay 80 is connected with the terminals 60 and 90 of the secondary winding 62 of the transformer 54 by the motor start circuit 98 including the main start switch 100. The push button of said main start switch is normally held in the open position shown in Fig. 11 by a spring (not shown in the drawings). A motor start holding circuit 102 including the holding switch 104 controlled by the electromagnet 78 of the main motor control relay and the stopping switch 106 controlled by the electromagnet 86 of the stop control relay 88 is connected with the terminals of the main start switch 100. When the electromagnets 78 and 86 are deenergized, the holding switch 104 is in the open position and the stopping switch 106 is in the closing position as shown in Fig. 11.

The electromagnet 78 of the main motor control relay 80 also controls the three motor control switches 108, 110, 112 arranged in the lines 46, 48 and 50 respectively; as long as the electromagnet 78 is deenergized, the motor control switches 108, 110, 112 are in the open position shown in Fig. 11.

When the push button of the main start switch 100 is pushed into the closing position against the action of its spring, the electromagnet 78 of the main motor control relay 80 is energized, so that the holding switch 104, the motor control switches 108, 110, 112, and the circuit breaking switch 76 are closed. This operation causes a closing of the lines 46, 48, 50 connecting the motor 22 of the warper with the alternating current supply line 44, so that the motor 22 is started for a winding of the warp yarns on the beam. As the motor start holding circuit 102 is also closed by the holding switch 104, the electromagnet 78 remains in energized condition for a running of the motor 22 upon a release of the spring actuated push button of the main start switch 100, which is returned by its spring into the open position shown in Fig. 11.

As pointed out above, the circuit breaking switch 76 is closed as long as the electromagnet 78 of the main motor control relay 80 is excited for a running of the motor 22. Furthermore, assume that all rows 56a, 56b, 56c . . . 56t of control needles 34 are needed for the control of the stop motion by the condition of the warp yarns, and that, consequently, all manual circuit closing switches 74a, 74b, 74c . . . 74t are closed as shown in Fig. 11. Under these conditions, the closing of the main needle control circuit 58, or of an additional needle control circuit 92b, 92c, 92d . . . 92t by the dropping of any of the control needles 34 into the "on-position" causes an energization of the electromagnet 86 of the stop control relay 88, whereby the stopping switch 106 is opened for an interruption of the motor start holding circuit 102. Said interruption of the motor start holding circuit 102, in turn, causes a deenergization of the electromagnet 78 of the main motor control relay 80, whereby the motor control switches 108, 110, 112 are opened for a stoppage of the motor 22.

Moreover, it will be apparent from above description of the circuits that the dropping of a control needle 34 into its "on-position" causes a lighting up of the control lamp 66a, or 66b, or 66c, . . . or 66t, which is connected with the row 56a, or 56b, or 56c, . . . or 56t, comprising the control needle 34 dropped into the "on-position," so that the operator of the warping plant may readily recognize the row containing the broken warp yarn. If, owing to breakage of warp yarn, control needles in several rows drop at the same time into the "on-position," the corresponding number of control lamps 66a, 66b, 66c, . . . 66t light up. In order to avoid an overloading of the sensitive stop control relay 88 by the current for a great number of control lamps 66a, 66b, 66c, . . . 66t lighting up at the same time, the above mentioned electrical safety means 82 is arranged in the main needle control circuit 58. In the embodiment shown in Fig. 11 said electrical safety means 82 consists of a safety lamp bank including three lamps 84 connected with each other in parallel, and serves to limit the current flowing through the sensitive stop control relay 88 to the current flowing through said three lamps.

An object of our invention is to provide electrical indicator control means in the electrically operated stop motion, by means of which the lighting up of an indicating control lamp 66a, or 66b, or 66c, . . . or 66t associated with a row 56a, or 56b, or 56c, . . . or 56t of control needles 34 cooperating with unbroken warp yarns is prevented after the lighting up of one or more indicating control lamps associated with one or more rows of control needles, which caused the lighting up of said last mentioned control lamps owing to a breakage of warp yarn. For example, if the indicating control lamp 66a lights up owing to the dropping of a control needle 34 of the row 56a into its "on-position" in response to the breakage of a warp yarn, the lighting up of the indicating control lamps 66b, 66c, 66d, . . . 66t shall be prevented, if, during the repair of the broken warp yarn the remaining unbroken warp yarns become slack and cause a dropping of one or more control needles 34 of the rows 56b, 56c, 56d, . . . 56t. For this purpose, we arrange the following electrical indicator control means in our system: A needle control holding circuit 114a is connected in parallel with that portion of the main needle control circuit 58, which includes the electromagnet 70a of the mechanical latch-in electric reset relay 72a and the circuit breaking switch 76 controlled by the electromagnet 78 of the main motor control relay 80. Said needle control holding circuit 114a includes the needle control holding switch 116a of the mechanical latch-in electric reset relay 72a. As long as, at the beginning of the operation, the electromagnet 70a is deenergized, the needle control holding switch 116a is in the open position shown in Fig. 11. As soon as the electromagnet 70a is energized owing to the closing of the main needle control circuit 58 by a control needle 34 of the row 56a, the needle control holding switch 116a is brought into closing position by said electromagnet 70a and now is held in said closing position by a latch mechanism (not shown in the drawings). Thus, the needle control holding circuit 114a is closed and the control lamp 66a remains in lit up condition, although the main needle control circuit 58 is interrupted by the circuit breaking switch 76 in response to the deenergization of the electromagnet 78 caused by an energization of the electromagnet 86 of the stop control relay as described above. Said interruption of the main needle control circuit 58 at the circuit breaking switch 76 prevents a subsequent lighting up of any one of the control lamps 66b, 66c, 66d, ... 66t upon the dropping of any one of the control needles 34 of the rows 56b, 56c, 56d, ... 56t arranged in the additional needle control circuits 92b, 92c, 92d, ... 92t.

Likewise, similar needle control holding circuits 114b, 114c, 114d, ... 114t including the needle control holding switches 116b, 116c, 116d, ... 116t of the mechanical latch-in electric reset relays 72b, 72c, 72d, ... 72t are arranged in parallel to the portions of the respective circuits including the electromagnets 70b, 70c, 70d, ... 70t and the circuit breaking switch 76. Therefore, if the control lamp 66b or 66c, or 66d, ... or 66t associated with a row 56b, or 56c, or 56d, ... or 56t has been lit up owing to breakage of warp yarn, the respective control lamp remains in lit up condition and the remaining control lamps are prevented from lighting up.

Of course, if two or more control lamps light up at the same time owing to the simultaneous breakage of warp yarn in two or more rows, said two or more control lamps remain in lit up condition while the remaining control lamps are prevented from a subsequent lighting up.

If, after the repair of the broken warp yarn or warp yarns, the motor 22 of the warper is restarted by a closing of the main start switch 100, the needle control holding switch or switches 116a, 116b, 116c, ... 116t of the actuated mechanical latch-in electric reset relay or relays 72a, 72b, 72c, ... 72t shall be reset into the open position shown in Fig. 11. For this purpose, the electromagnet 118a of the mechanical latch-in electric reset relay 72a is arranged in a reset circuit 120a connected with the terminals 60 and 90 of the secondary winding 62 of the transformer 54. Said reset circuit includes a resetting switch 122, the push button of which is mechanically connected with the push button of the main start switch 100 as indicated by the member 124. Thus, if the start switch 100 is closed, the resetting switch 122 is closed at the same time causing an energization of the electromagnet 118a, whereby the latch mechanism (not shown) is drawn from under the needle control holding switch 116a, so that the latter drops into the open position shown in Fig. 11. Likewise, the electromagnets 118b, 118c, 118d, ... 118t of the mechanical latch-in electric reset relays 72b, 72c, 72d, ... 72t are arranged in reset circuits 120b, 120c, 120d, ... 120t connected in parallel with the reset circuit 120a, so that the closing of the resetting switch 122 causes a simultaneous resetting of all needle control holding switches 116b, 116c, 116d, ... 116t into the open position shown in Fig. 11.

The resistors 68a, 68b, 68c, ... 68t arranged in parallel to the control lamps 66a, 66b, 66c, ... 66t permits an operation of the above described stop motion, if one or more of the control lamps 66a, 66b, 66c, ... 66t should be burned out.

Fig. 11 illustrates a certain embodiment of an electric stop control 88, 80. It is understood, however, that any other embodiment of a stop control may be used in combination with the various circuits of our stop motion. For example, our stop motion may be used in combination with the electrical control system for a warping or beaming plant disclosed in the U. S. Patent #2,324,611, issued July 20, 1943, of one of the coinventors. In such a case the above described needle control circuit 58 substantially corresponds to the circuit 630, 634 of the system disclosed in Fig. 2 of said patent. In said patent, for example, the stop motion applies the brakes of the warper in addition to the stoppage of the motor of the warper.

Fig. 11 does not show a main stop switch to be mounted on the warper for stopping the motor 22 by hand at will. Fig. 11, however, illustrates a manual auxiliary stop switch 126 arranged in parallel with the control needles 34 of the second row 56b. Said manual auxiliary stop switch 126 is mounted on the arm 32b of the frame 30, as best shown in Fig. 3, so that the operator may stop the warping or beaming plant by pressing down the manual auxiliary stop switch against the action of a spring (not shown) if he stands near the creel.

Needless to say that one or more circuit closing switches 74a, 74b, 74c, ... 74t may be brought into open position for disconnecting one or more rows 56a, 56b, 56c, ... 56t of control needles 34 from the system, if, in dependence on the amount of warp yarns to be wound, one or more of such rows of needles are idle.

Fig. 12 illustrates a somewhat different embodiment of our electrically operated stop motion. According to Fig. 12 the various mechanical latch-in electric reset relays are replaced by an annunciator generally indicated by 128, for indicating the numerals pertaining to the rows 56a, 56b, 56c, ... 56t of control needles 34, which have been actuated by a warp yarn breakage. According to Fig. 3, such an annunciator 128 may be mounted on the frame 30 carrying the rows of control needles. Referring now to Fig. 12, the annunciator 128 comprises twenty indicating members 130a, 130b, 130c, ... 130t swingably mounted at 132a, 132b, 132c, ... 132t. Said indicating members 130a, 130b, 130c, ... 130t, carrying the numerals 134a, 134b, 134c, ... 134t are normally held by a catching member 136a, 136b, 136c, ... 136t in the position shown in full lines in Fig. 12, so that the numerals 134a, 134b, 134c, ... 134t are not visible in the window of the annunciator. The catching members 136a, 136b, 136c, ... 136t pivotally mounted at 138a, 138b, 138c, ... 138t are held in the position shown in Fig. 12 by an abutment (not shown in the drawings). The catching members 136a, 136b, 136c, ... 136t are controlled by release magnets 140a, 140b, 140c, ... 140t arranged in the main needle control circuit 58 and the additional needle control circuits 92b, 92c, 92d, ... 92t.

The main needle control circuit 58, the additional needle control circuits 92b, 92c, 92d, ... 92t, the needle control holding circuits 114a, 114b, 114c, ... 114t, the reset circuits 120a, 120b, 120c, ... 120t of Fig. 12 correspond to the circuits indicated by the same reference numerals in Fig. 11. The primary winding 52 of the transformer 54 is connected with the alternating current supply line 44. According to Fig. 12, however, a separate direct current supply line 142 is used for supplying current to the electromagnet 78 of the main motor control relay 80 and to the motor 22 of the warper. The electromagnet 78 is connected with the D. C. supply line 142 by the motor start circuit 144, and the motor 22 is connected with said D. C. supply line 142 by a circuit 146 including a motor control switch 148 controlled by the electromagnet 78 of the main motor control relay.

The needle control holding circuits 114a, 114b, 114c, . . . 114t include the needle control holding switches 150a, 150b, 150c, . . . 150t, which are normally held in open position by a spring or the like (not shown in the drawings). If a needle control circuit 58, or 92b, or 92c, or 92d, . . . or 92t is closed by a control needle 34, the release magnet 140a, or 140b, or 140c, . . . 140t is excited, whereby the catching member 136a, 136b, 136c, . . . 136t is turned in counterclockwise direction, as viewed in Fig. 12, causing the release of the associated indicating member 130a, 130b, 130c, . . . 130t. The released indicating member swings into the indicating position shown in dash lines in Fig. 12, whereby the numeral carried by said indicating member becomes visible in the window of the annunciator. At the same time, the hook-like end of the indicating member swung into the indicating position closes the associated needle control holding switch 150a, or 150b, or 150c, . . . 150t and holds same in the closed position. The opening of the circuit breaking switch 76 effected by the energization of the electromagnets 86 and 78 in response to the dropping of a control needle 34 into the "on-position" results in a deenergization of the release magnet 140a, or 140b, or 140c, . . . 140t whereby the associated catching member 136a, 136b, 136c, . . . 136t is returned into the position shown in Fig. 12. The resetting of the indicating members 130a, 130b, 130c, . . . 130t and reopening of the needle control holding switches 150a, 150b, 150c, . . . 150t at the restarting of the motor 22 is obtained by reset rod magnets 152a, 152b, 152c, . . . 152t arranged in the resetting circuits 120a, 120b, 120c, . . . 120t. The rods 154a, 154b, 154c, . . . 154t controlled by said reset rod magnets push the indicating members 130a, 130b, 130c, . . . 130t into their normal position shown in full lines in Fig. 12, whereby the needle control holding switches 150a, 150b, 150c, . . . 150t are disengaged from the indicating members and are returned into the open position by the associated spring (not shown). It may be mentioned that instead of twenty resetting rods 154a, 154b, 154c, . . . 154t a single resetting rod may be used, which is capable of engaging all twenty indicating members for resetting same. As will be understood from above description and the drawings, the operation of the stop motion shown in Fig. 12 is in principle the same as the operation of the stop motion shown in Fig. 11.

The control needles 34 used in the above described stop motion may be of any type, for example, of the conventional drop wire type. Furthermore, the frame carrying such control needles may be of any type, and moreover, the frame carrying such control needles may be arranged at any suitable place, for example, at the creel, or at the warper, or beamer, or at a place between the creel and warper or beamer.

Figs. 1–10 illustrate a frame 30 with adjustable arms 32 for carrying the control needles 34 comprising mercury switches 156. The frame may be readily attached to various types of creels and may be readily adjusted to the requirements of the respective creel. The enclosed contacts of the mercury switches 156 prevent any accumulation of dust or lint on such contacts, so that a perfect operation of the stop motion is assured.

As best shown in Fig. 3, the frame 30 comprises a stand including two uprights 158, 160 spaced from each other at a suitable distance, corresponding to the measurements of the creel, and connected with each other by a rod 162, or the like. The uprights 158, 160 are mounted in bases 164, 166, which may be screwed to the ground. According to Fig. 1, the frame 30 may be connected with the creel by the members 31. Of course, the frame may be connected with the creel in any different way, if desired. If the stop motion is equipped with an annunciator, such an annunciator 128 may be mounted on the connecting rod 162.

Each upright 158 and 160 carries a plurality of arms 32 for the support of the control needles 34. In the embodiment shown in Fig. 3, the upright 158 carries ten arms 32a to 32j, and the upright 160 carries ten arms 32k to 32t. Each arm 32a, 32b, 32c, . . . 32t carries a row of control needles 34, the control needles of each row being electrically connected with each other in parallel. Furthermore, each arm 32a, 32b, 32c, . . . 32t carries a manual circuit closing switch 74a, 74b, 74c, . . . 74t and a control lamp 66a, 66b, 66c, . . . 66t, both electrically connected in series with the row of control needles on the respective arm. In the embodiment shown in Fig. 3, the above described manual auxiliary stop switch 126 for stopping the warping or beaming plant is mounted on the second arm 32b on the left hand side of the frame.

Each arm 32a, 32b, 32c, . . . 32t is slidably and swingably mounted on the uprights 158 and 160 and may be held in its adjusted position by screws 168 or the like.

Fig. 3 illustrates the adjustment of one of the arms, the arm 32a, in vertical direction by sliding same in the direction of the longitudinal axis of the upright 158 from the position 32a into the position 32a'. Of course, all of the remaining arms 32b, 32c, 32d, . . . 32t may be adjusted in the same manner for bringing the rows of control needles in a suitable plane with respect to the arrangement of the bobbins in the creel.

Figs. 1 and 2 illustrate the adjustment of the arms 32 of the frame 30 by swinging same to a certain degree around the upright 158 or 160. If, for example, an arm 32 is in the position shown in full lines in Figs. 1 and 2, a warp yarn 36 travels as shown by full lines in Fig. 2. Under these conditions the angle $\alpha$ between the oncoming end of the warp yarn 36 and the arm 32 is considerably larger than the angle $\beta$ between the leaving end of the warp yarn 36 and the arm 32. If the arm 32 is swung into the position 32'' shown in dash lines, the angle $\alpha$ is reduced to the angle $\alpha''$ and the angle $\beta$ is enlarged to the angle $\beta''$, so that it is possible to obtain practically equal angles, whereby a smoother running of the warp yarns is assured. Thus, as will be readily understood, the adjustable arrangement of the arms 32a, 32b, . . . 32t on the uprights 158, 160 of the frame permits the adjustment of said arms with the control needles 34 in various positions relative to the stationary creel 26 carrying the bobbins 28.

In the embodiment shown in Fig. 1 the bobbins 28 are arranged on the inside of the stationary creel; there are, however, stationary creels on the market wherein the bobbins are arranged on the outside, and the warp yarns leave the creel substantially in the middle thereof. The frame 30 shown in Figs. 1–3 may be readily adapted to such type of creels by swinging the arms through an angle of about 180°, as shown in connection with the arm 32m, which, for example, may be turned into the position 32m'''.

If desired, the connecting rod 162 of the frame 30 may be either exchangeable or adjustable, so that the distance between the uprights 158 and 160 may be changed in accordance with the measurements of the creel for which the frame is to be used.

As will be apparent from above description of the frame 30, the adjustable construction of the frame permits the use of the frame with stationary creels of any type and measurement, so that, if desired, the same frame may be used for several creels of different types.

As best shown in Figs. 4–10, each control needle 34 mounted on the arms 32 of the frame 30 comprises a control finger 40 rigidly secured to the wall of the casing of a mercury switch 156. In the preferred embodiment shown in the drawings, the metallic control finger 40 is fused with the glass wall of the casing of the mercury switch 156. The wire forming the control finger 40 is bent in a suitable manner so as to form a projecting end comprising a loop for receiving an eyelet 38 of porcelain or the like. The eyelet 38 forms a passage for the warp yarn 36.

According to Fig. 8, wires generally indicated by 170 are fused with the glass wall of the casing of the mercury switch 156 so that they are rigidly connected therewith. The end 172 of said wires 170 projecting from the outside of the casing of the mercury switch form the pivots of the mercury switch. The inner ends 174 of said wires 170 are bent in a suitable manner so that they may form the contact elements of the mercury switch. If, during the normal operation of the warping plant, the mercury switch 156 is in its "off-position" as shown in Figs. 6 and 9, the contact elements 174 are at a suitable distance from the mercury 176 enclosed in the casing of the mercury switch 156, so that the circuit including the mercury switch is interrupted. If, however, owing to a breakage of warp yarn, the mercury switch 156 is swung into the "on-position" shown in Figs. 7 and 10, the ends of the contact elements 174 immerse in the mercury 176 for closing the circuit including the mercury switch. As will be apparent from above description, the pivots 172 of each mercury switch 156 are electrically connected with the contact elements 174; in the described embodiment the pivots are integral with the contact elements, but any other electrical connection between the pivots and the contact elements of the mercury switches may be chosen, if desired.

As best shown in Figs. 4, 6, 7 and 8, the row of control needles 34 comprising the control fingers 40 connected with the mercury switches 156 is mounted on a row of spaced supporting members 178. Each mercury switch is swingably arranged on two successive supporting members 178 by its pivots 172 resting on suitable bearings 180 of the supporting members. The pivots 172 are held in the bearings 180 by shiftable slides 182. If it is desired to insert a control needle 34 into its place, or to exchange a control needle 34, the slides are moved into the position 182', as shown in Fig. 8, whereby the bearing 180 becomes accessible.

As pointed out above, the pivots 172 of the mercury switches are electrically connected with the contact elements 174. Accordingly, one of said pivots must be electrically connected with one terminal of the electric source, and the other pivot must be electrically connected with the other terminal of the electric source. In order to obtain this feature, we make the following arrangement:

The supporting members 178 are made of a conducting material, for example, of metal. These metallic supporting members 178 are mounted on one side of a supporting bar 184 made of a non-conducting material. Two bus-bars 186 and 188 are arranged on the other side of said supporting bar 184. As best shown in Fig. 5, the bus-bar 186 is electrically connected with a first feeding line 580 diagrammatically shown in dash and dot lines; said first feeding line 580 including the creel lamp 66 is electrically connected with one terminal of the electric source, for example, the terminal 60 of the transformer 54, shown in Fig. 11. Furthermore, according to Fig. 5, the bus-bar 188 is electrically connected with a second feeding line 580' which, in turn, is electrically connected with the second terminal of the electric source, for example, the terminal 90 of the transformer 54, shown in Fig. 11. Moreover, according to Figs. 5–8, a first series of alternate supporting members 178 is electrically connected with the first bus-bar 186 by screws 190 of conducting material, while a second series of alternate supporting members 178 is electrically connected with the second bus-bar 188 by screws 192 of conducting material. As best shown in Figs. 6 and 7, each supporting member 178 is secured to the supporting bar 184 by two screws, only one of said two screws being electrically connected with a bus-bar; if, for example, the screw 190 is electrically connected with the bus-bar 186 by its head resting on the surface of the bus-bar, the other screw 194 is not electrically connected with the bus-bar 188, as the head 196 rests on the shoulder of a recess 198 arranged in the non-conducting supporting bar 184. As will be apparent from above description, a first series of alternate supporting member 178 is electrically connected with the first feeding line 580, and a second series of alternate supporting members 178 is electrically connected with the second feeding line 580'. Thus, as according to Fig. 8, each mercury switch 156 is arranged between two successive supporting members 178, one pivot 172 of each mercury switch is electrically connected with the first feeding line, and the second pivot 172 of each mercury switch 156 is electrically connected with the other feeding line.

The contact between the pivots 172 and the bearings 180 is sufficient for assuring the electrical connection of the pivots with the feeding lines. If desired, however, this electrical connection may be improved by wires 200, the ends of which being soldered to the ends of the pivots and to a point of the supporting members.

The right hand end of the non-conducting supporting bar 184, as viewed in Figs. 4 and 5, is secured by screws 202 to an embracing member or split collar 204 of the arm 32 which, in turn, is clamped on the upright 158 by means of the locking screws 168 in an adjusted position. The left hand end of the non-conducting supporting bar 184 is connected with a member 206 by means of screws 208. Said member 206 carries a manual auxiliary stop switch 126 for stopping the warping or beaming plant, a circuit closing switch 74 for rendering operative the row of control needles 34 on the arm, and a resistor 68 electrically connected in parallel with the control lamp 66. A tubular member 210 connected with the split collar 204 or the like and the member 206 by screws 212 and screws 214 respectively serves to reinforce the arm 32.

A series of eyelets 216 is arranged in suitable openings of the non-conducting supporting bar 184 to form a passage for the warp yarns 36 after their passage through the eyelets 38 of the control fingers 40.

A guiding rod 218 is arranged between an extension 220 of the member 206 and an extension 222 of the embracing member or split collar 204. Furthermore, two limiting bars 224 and 226 are arranged between said extensions 220 and 222 parallel to said guiding rod 218.

As best shown in Fig. 6, during the normal operation of the warping or beaming plant, the warp yarns 36 travel over the surface of the guiding rod 218. The upper limiting bar 224 limits the upward movement of the control finger 40 so as to prevent an undue vibration of the control finger 40.

Upon a breakage of warp yarn the control finger 40 drops into the position shown in Fig. 7, wherein it is held by the lower limiting bar 226. As described above, the mercury switch 156 connected with the control finger 40 is in this position in the "on-position" for closing the circuit actuating the stop motion of the warping or beaming plant.

In the embodiment shown in the drawings, the control needles comprising a mercury switch are mounted on a frame with adjustable arms. It is understood, however, that this type of control needles with a mercury switch may also be mounted on conventional frames having stationary arms or supporting members for the control needles. On the other hand, the frame with adjustable arms may be used for the support of any other type of control needles, for example, for the support of the conventional drop wire control elements.

We have described preferred embodiments of our invention, but it is clear that numerous changes and omissions may be made without departing from the spirit of our invention.

What we claim is:

1. An electrically operated stop motion for a warping or beaming plant comprising, a plurality of rows of control needles responsive to breakage of warp yarn, the control needles of each row being electrically connected with each other in parallel, a plurality of electrical indicating means, a plurality of electromagnetic controlling means, a circuit breaking switch, a main needle control circuit including in series one of said rows of control needles one of said electrical indicating means one of said electromagnetic controlling means and said circuit breaking switch, a plurality of additional needle control circuits, each of said additional needle control circuits including in series another of said rows of control needles another of said electrical indicating means and another of said electromagnetic controlling means, each of said additional needle control circuits being electrically connected in parallel with said main needle control circuit, an electrical stop control for a stoppage of the warping or beaming plant upon an actuation of said stop control, said circuit breaking switch being controlled by said electrical stop control so as to interrupt said main needle control circuit upon an actuation of said stop control, said electrical stop control being included in said main needle control circuit so as to be actuated upon a closing of a needle control circuit by a control needle in response to breakage of warp yarn, a plurality of needle control holding circuits associated with said plurality of needle control circuits, each needle control holding circuit being electrically connected in parallel with a portion of the associated needle control circuit including the electromagnetic controlling means and the circuit breaking switch, and a needle control holding switch arranged in each needle control holding circuit, each needle control holding switch being normally open and being controlled by the electromagnetic controlling means of the associated needle control circuit so as to be closed upon a closing of the said needle control circuit in response to breakage of warp yarn.

2. In combination with the electrically operated stop motion as claimed in claim 1, electrical safety means connected with the circuit including the electrical stop control for preventing an overloading thereof upon a simultaneous actuation of a plurality of electrical indicating means.

3. In combination with the electrically operated stop motion as claimed in claim 1, a safety lamp bank including a plurality of lamps connected with each other in parallel, said safety lamp bank being arranged in the circuit including the electrical stop control for limiting the flow of current through said stop control.

4. In combination with the electrically operated stop motion as claimed in claim 1, a manual auxiliary stop switch electrically connected in parallel with the control needles of one of the rows of control needles.

5. In combination with the electrically operated stop motion as claimed in claim 1, a plurality of circuit closing switches, one of said circuit closing switches being arranged in each of said needle control circuits.

6. In combination with the electrically operated stop motion as claimed in claim 1, a resetting circuit including a resetting switch and electromagnetic resetting means, said electromagnetic resetting means controlling said needle control holding switches for returning same into the open position upon an actuation of said resetting switch.

7. An electrically operated stop motion for a warping or beaming plant comprising: a plurality of rows of control needles responsive to breakage of warp yarn, the control needles of each row being electrically connected with each other in parallel, an annunciator including a plurality of indicating members and a plurality of electromagnetic controlling means for controlling said indicating members, a circuit breaking switch, a main needle control circuit including in series one of said rows of control needles one of said electromagnetic controlling means and said circuit breaking switch, a plurality of additional needle control circuits, each of said additional needle control circuits including in series another of said rows of control needles and another of said electromagnetic controlling means, each of said additional needle control circuits being electrically connected in parallel with said main needle control circuit, an electrical stop control for a stoppage of the warping or beaming plant upon an actuation of said stop control, said circuit breaking switch being controlled by said electrical stop control so as to interrupt said main needle control circuit upon an actuation of said stop control, said electrical stop control being included in said main needle control circuit so as to be actuated upon a closing of a needle control circuit by a control needle in response to breakage of warp yarn, a plurality of needle control holding circuits associated with said plurality of needle control circuits, each needle control holding circuit being electrically connected in parallel with a portion of the associated needle control circuit including the electromagnetic controlling means and the circuit breaking switch, and a needle control holding switch arranged in each needle control holding circuit, each needle control holding switch being normally open and being controlled by the electromagnetic controlling means of the associated needle control circuit so as to be closed upon a closing of the said needle control circuit by a control needle in response to breakage of warp yarn.

8. An electrically operated stop motion for a warping or beaming plant comprising: a plurality of rows of control needles responsive to breakage of warp yarn, the control needles of each row being electrically connected with each other in parallel, an annunciator, a plurality of movable indicating members arranged in said annunciator, a plurality of releasing magnets normally holding said indicating members in a non-indicating position, each release magnet being arranged for releasing the associated indicating member upon an energization thereof so that the indicating member moves into an indicating position, a circuit breaking switch, a main needle control circuit including in series one of said rows of control needles one of said release magnets and said circuit breaking switch, a plurality of additional needle control circuits, each of said additional needle control circuits including in series another of said rows of control needles and another of said release magnets, each of said additional needle control circuits being electrically connected in parallel with said main needle control circuit, an electrical stop control for a stoppage of the warping or beaming plant upon an actuation of said stop control, said circuit breaking switch being controlled by said electrical stop control so as to interrupt said main needle control circuit upon an actuation of said stop control, said electrical stop control being included in said main needle control circuit so as to be actuated upon a closing of a needle control circuit by a control needle in response to breakage of warp yarn, a plurality of needle control holding circuits associated with said plurality of needle control circuits, each needle control holding circuit being electrically connected in parallel with a portion of the associate needle control circuit including the release magnet and the circuit breaking switch, a needle control holding switch arranged in each needle control holding circuit, each needle control holding switch being normally open and being controlled by the indicating member of the associated needle control circuit so as to be held in closed position by the indicating member in its indicating position upon a closing of the said needle control circuit by a control needle in response to breakage of warp yarn, and an annunciator resetting circuit including a resetting switch and at least one electromagnetic resetting means for resetting the indicating members into the non-indicating position.

9. In combination with the electrically operated stop motion as claimed in claim 7, a plurality of sets including a control lamp and a resistor electrically connected with each other in parallel, one of said sets being arranged in each of said needle control circuits.

10. In combination with the electrically operated stop motion as claimed in claim 7, a plurality of circuit closing switches, one of said circuit closing switches being arranged in each of said needle control circuits.

11. In combination with the electrically operated stop motion as claimed in claim 7, a plurality of sets including a control lamp and a resistor electrically connected with each other in parallel, and a plurality of circuit closing switches, one of said sets and one of said circuit closing switches being arranged in each of said needle control circuits.

12. In combination with the electrically operated stop motion as claimed in claim 7, a plurality of sets including a control lamp and a resistor electrically connected with each other in parallel, one of said sets being arranged in each of said needle control circuits, and a safety lamp bank including a plurality of lamps connected with each other in parallel, said safety lamp bank being arranged in the circuit including the electrical stop control for limiting the flow of current through said stop control.

13. In combination with the electrically operated stop motion as claimed in claim 7, a plurality of sets including a control lamp and a resistor electrically connected with each other in parallel, a plurality of circuit closing switches, one of said sets and one of said circuit closing switches being arranged in each of said needle control circuits, and a safety lamp bank including a plurality of lamps connected with each other in parallel, said safety lamp bank being arranged in the circuit including the electrical stop control for limiting the flow of current through said stop control.

14. An electrically operated stop motion for a warping or beaming plant comprising: a plurality of rows of control needles responsive to breakage of warp yarn, the control needles of each row being electrically connected with each other in parallel, a plurality of electrical indicating means, a main needle control circuit including one of said rows of control needles and one of said electrical indicating means, a plurality of additional needle control circuits, each of said additional needle control circuits including another of said rows of control needles and another of said electrical indicating means, each of said additional needle control circuits being electrically connected in parallel with said main needle control circuit, an electrical stop control included in said main needle control circuit for a stoppage of the warping or beaming plant upon an actuation of said stop control by a closing of a needle control circuit through a control needle in response to breakage of warp yarn, and a safety lamp bank including a plurality of lamps connected with each other in parallel, said safety lamp bank being arranged in the circuit including the electrical stop control for limiting the flow of current through said stop control so as to prevent an overloading of said stop control upon a simultaneous actuation of a plurality of electrical indicating means.

15. A frame for the support of control needles of a stop motion of a warping or beaming plant and for use in combination with a stationary creel carrying series of bobbins, comprising a stand including at least one upright, means for holding said stand in a predetermined position relative to said stationary creel, a plurality of arms, a row of control needles being mounted on each of said arms for engagement with warp yarns drawn from said bobbins, a split collar arranged at one end of each arm for movable and adjustable engagement with said upright, and locking means associated with said split collar for clamping same on said upright and holding said arms on said upright in a predetermined position relative to said stationary creel.

16. A frame for the support of control needles of a stop motion for a warping or beaming plant and for use in combination with a stationary creel carrying series of bobbins, comprising a stand including at least one upright, means for holding said stand in a predetermined position relative to said stationary creel, connecting means associated with said stand for a detachable attachment thereof to said stationary creel, a plurality of arms, a row of control needles being mounted on each of said arms for engagement with warp yarns drawn from said bobbins, embracing means arranged at one end of each arm for movable and adjustable engagement with said upright, and locking means associated with said embracing means for holding said arms on said upright in a predetermined position relative to said stationary creel.

17. A frame for the support of control needles of an electrically operated stop motion for a warping or beaming plant comprising: a plurality of supporting members mounted on said frame, a row of control needles mounted on each supporting member, the control needles of each row being electrically connected with each other in parallel, and a plurality of circuit closing switches, each supporting member carrying one of said circuit closing switches, and each circuit closing switch on each supporting member being electrically connected in series with the row of control needles arranged on the supporting member carrying such a circuit closing switch.

18. A frame for the support of control needles of an electrically operated stop motion for a warping or beaming plant comprising: a plurality of supporting members mounted on said frame, a row of control needles mounted on each supporting member, the control needles of each row being electrically connected with each other in parallel, and a manual auxiliary stop switch mounted on one of said plurality of supporting members, said manual auxiliary stop switch being electrically connected in parallel with the control needles of the row of control needles arranged on the supporting member carrying said manual auxiliary stop switch.

19. A frame for the support of control needles of an electrically operated stop motion for a warping or beaming plant comprising: a plurality of supporting members mounted on said frame, a row of control needles mounted on each supporting member, the control needles of each row being electrically connected with each other in parallel, a plurality of circuit closing switches, each supporting member carrying one of said circuit closing switches, and each circuit closing switch on each supporting member being electrically connected in series with the row of control needles arranged on the supporting member carrying such a circuit closing switch, and a manual auxiliary stop switch mounted on one of said plurality of supporting members, said manual auxiliary stop switch being electrically connected in parallel with the control needles of the row of control needles arranged on the supporting member carrying said manual auxiliary stop switch.

20. A frame for the support of control needles of a stop motion of a warping or beaming plant and for use in combination with a stationary creel carrying series of bobbins, comprising a stand including at least one upright, means for holding said stand in a predetermined position relative to said stationary creel, a plurality of arms, one end of each arm being movably and adjustably engaged with said upright, clamping means arranged on said ends of the arms for holding said arms on said upright in a predetermined adjusted position relative to said stationary creel, a row of control needles being mounted on each of said arms for engagement with warp yarns drawn from said bobbins, said control needles of each row being electrically connected with each other in parallel, and a circuit closing switch mounted on each arm, each circuit closing switch being electrically connected in series with the row of control needles on the arm.

21. A frame for the support of control needles of a stop motion of a warping or beaming plant and for use in combination with a stationary creel carrying series of bobbins, comprising a stand including at least one upright, means for holding said stand in a predetermined position relative to said stationary creel, a plurality of arms, one end of each arm being movably and adjustably engaged with said upright, clamping means arranged on said ends of the arms for holding said arms on said upright in a predetermined adjusted position relative to said stationary creel, a row of control needles being mounted on each of said arms for engagement with warp yarns drawn from said bobbins, said control needles of each row being electrically connected with each other in parallel, and a manual auxiliary stop switch mounted on an arm, said manual auxiliary stop switch being electrically connected in parallel with the control needles of the row of control needles on the arm.

22. A frame for the support of control needles of a stop motion of a warping or beaming plant and for use in combination with a stationary creel carrying series of bobbins, comprising a stand including at least one upright, means for holding said stand in a predetermined position relative to said stationary creel, a plurality of arms, one end of each arm being movably and adjustably engaged with said upright, clamping means arranged on said ends of the arms for holding said arms on said upright in a predetermined adjusted position relative to said stationary creel, a row of control needles being mounted on each of said arms for engagement with warp yarns drawn from said bobbins, said control needles of each row being electrically connected with each other in parallel, a circuit closing switch mounted on each arm, each circuit closing switch being electrically connected in series with the row of control needles on the arm, and a manual auxiliary stop switch mounted on an arm, said manual auxiliary stop switch being electrically connected in parallel with the control needles of the row of control needles on the arm.

FRITZ LAMBACH.
WALTER SIEGEL.